United States Patent [19]

Shelley

[11] Patent Number: 4,578,534

[45] Date of Patent: Mar. 25, 1986

[54] TIME INDEPENDENT DATA TRANSMISSION SYSTEM

[76] Inventor: Edwin F. Shelley, 339 Oxford Rd., New Rochelle, N.Y. 10804

[21] Appl. No.: 643,450

[22] Filed: Aug. 23, 1984

[51] Int. Cl.⁴ .................................. H04M 11/08
[52] U.S. Cl. .................. 179/2 C; 179/2 DP; 179/2 AM
[58] Field of Search .......... 179/2 A, 2 AM, 2 C, 179/2 DP, 84 C, 89

[56] References Cited

U.S. PATENT DOCUMENTS

| | | | |
|---|---|---|---|
| 4,104,486 | 8/1978 | Martin et al. | 179/2 AM |
| 4,126,762 | 11/1978 | Martin et al. | 179/2 A |
| 4,345,113 | 8/1982 | Shelley | 179/2 A |
| 4,355,205 | 10/1982 | Walker | 179/2 AM X |
| 4,394,540 | 7/1983 | Willis et al. | 179/2 A |
| 4,469,917 | 12/1982 | Shelley | 179/2 DP |

Primary Examiner—Gene Z. Rubinson
Assistant Examiner—W. J. Brady
Attorney, Agent, or Firm—Kenyon & Kenyon

[57] ABSTRACT

A time independent data transmission system which allows a computer to access a remote data set at any time via a non-dedicated telephone line is disclosed. The system is coupled to a telephone instrument, a data set and the telephone transmission line and normally connects the data set to the telephone transmission line. The telephone instrument is normally disconnected. In a preferred embodiment, a counting circuit senses the number of ring bursts in a ringing signal from a caller and a central computer is programmed to transmit a ringing signal having only one ring burst. When only one ring burst is sensed, the data set remains connected to the telephone transmission line and the data set begins to communicate with the central computer when the ringing signal terminates. If more than one ring burst occurs, a non-computer call is being sensed and the data set is disconnected and the telephone connected to the telephone transmission line so that normal telephone usage is allowed. Communication between the computer and the data set via the telephone line occurs without ringing the telephone instrument and without otherwise interfering with normal telephone usage. In the event the user wishes to use the telephone instrument at any time, including the time when communication between the computer and data set is taking place, a subscriber priority circuit allows the user to recouple the instrument to the line by merely lifting the telephone handset and to decouple the instrument by replacing the handset.

11 Claims, 2 Drawing Figures

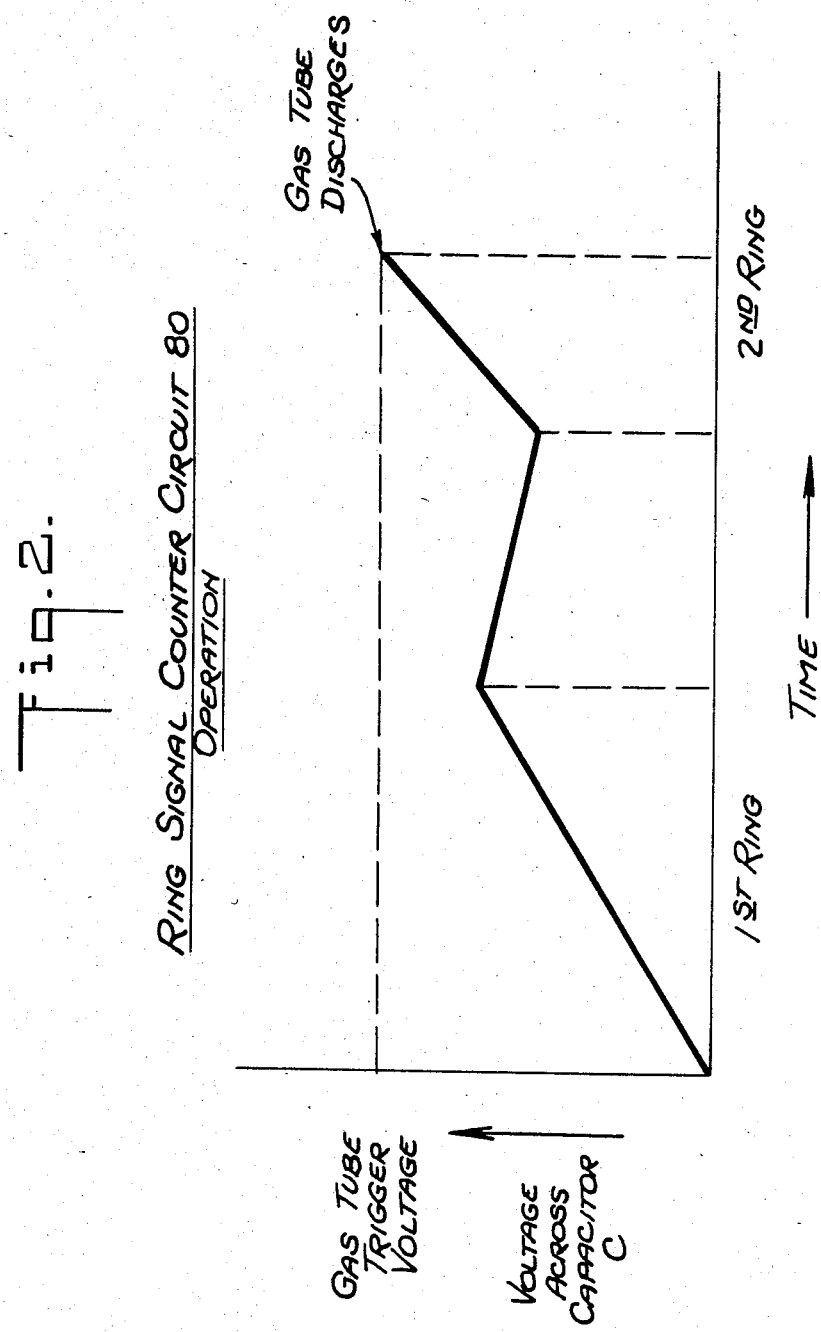

TIME INDEPENDENT DATA TRANSMISSION SYSTEM

BACKGROUND OF THE INVENTION

1. Cross Reference to Related Application

This application for patent is related to prior copending application U.S. Ser. No. 449,756, now U.S. Pat. No. 4,469,917, filing date 12-14-82, Synchronized Data Transmission System.

2. Field of the Invention

The present invention relates generally to telephone data transmission systems, and more particularly to a time independent data transmission system which allows a central computer, for example, to access at any time a remote data set, such as an electronic publication storage device, a hybrid telephone-cable television polling system, or a computer data base subscriber's data set, via non-dedicated telephone lines and communicate with that data set without interfering with normal use of the subscriber's telephone. The present invention finds application in many areas, one of which, for instance, might be a shop-by-computer system where it might be necessary to transmit information to and from an individual subscriber's data set connected to an information storage device. Another might be the field of power demand data retrieval, wherein a central computer accesses a remote data set which has stored therein data corresponding to the electrical or other power consumed at the remote location. Still another might be remote control of heating, ventilating and air conditioning equipment through telephone lines. Although the invention will be described for use with telephone lines, it will be apparent to one skilled in the art that the invention can also be used with transmission media other than telephone lines.

3. Description of the Prior Art

Various systems are presently known which allow central computers to access individual subscriber's data sets via dedicated telephone lines. For example, see U.S. Pat. Nos. 4,126,762, 4,104,486, 4,394,540 and 4,345,113. In the U.S. Pat. Nos. 4,104,486 and 4,394,540 patents, the telephone is isolated from the telephone line during a selected time window. In the U.S. Pat. No. 4,126,762 patent, in one embodiment, a time window is utilized. In another embodiment, sequential ringing signals, having a different time spacing than signals from a normal telephone call condition the remote terminal to intercept the ringing signals and to provide selective connection of a data accumulator to the telephone line. It is preferable to use the subscriber's existing telephone line rather than install a separate dedicated line to provide access to the data set. Thus, systems of this type require that the telephone line be available for both use by ordinary persons and by computers calling the subscriber. Requirements of systems of this type are that when computer calls are received the call is automatically transferred to a data set and the telephone preferably should not ring.

In applicant's prior U.S. Pat. No. 4,345,113, an automatic telephone message interception system is described which permits the use of a single telephone line for both ordinary personal use and for receiving calls from a computer, wherein computer calls are automatically transferred to the subscriber's data set without ringing the subscriber's telephone. An ordinary (non-computer) call made to the subscriber, would, however, be answered by the automatic telephone message interception system described in this U.S. patent even if no one were present at the subscriber's telephone. The caller would thus be charged for a brief call even though no one answered the phone.

The subscriber could, of course, solve this problem by shutting off the automatic system if the telephone is to be left unattended, but the data set could not be accessed by the computer while the system was shut off.

The need thus existed for a system which both allows a central computer to access the subscriber's data set via a non-dedicated telephone line and which allows normal operation of the telephone by both the subscriber and other persons calling the subscriber. In particular, such a system should allow a computer to access the subscriber's data set without ringing the subscriber's telephone and should allow persons to call the subscriber at any time without being charged for the call if the telephone is unanswered.

In applicant's prior copending application U.S. Ser. No. 449,756 and filing date 12-14-82, an apparatus which satisfies the above need is described.

In that patent application, however, a system and apparatus is described for connecting a central computer to a remote subscriber's data set using the subscriber's non-dedicated telephone line during a preselected window in time. In the present application, the apparatus described in that patent application has been modified to permit connection of the central computer at any time to a remote subscriber's data set using the subscriber's non-dedicated telehone line and without interference of any sort with the normal use of the subscriber's telephone. In the system described in the above patent application Ser. No. 449,756, and filing date 12-14-82, the apparatus detects a ringing signal on the telephone line during a preselected window in time during which the subscriber's data set is connected to the telephone line and the subscriber's telephone instrument is disconnected. The apparatus does nothing until the ringing signal stops, indicating that the caller has hung up. The apparatus then causes the data set to dial up the central computer and proceed to transmit or receive data during the time window.

Accordingly, the need exists for a system which allows a central computer to access a subscriber's data set via non-dedicated telephone lines at any time (i.e., no limitation to a time window). Furthermore, such a system should allow normal operation of the telephone by the subscriber without interference in any way with the subscriber's use of the telephone at any time, i.e., the subscriber's telephone should not ring when the central computer calls, the subscriber should be allowed to use the telephone even if data transmission with the computer is occurring and outside callers should not be charged for calls when the phone is unanswered, for example.

SUMMARY OF THE INVENTION

It is therefore an object of the present invention to provide an improved automatic data transmission system which allows a central computer to access the subscriber's data set at any time.

It is a further object of the invention to provide an automatic data transmission system which allows normal use of the subscriber's telephone by the subscriber at all times.

Another object of the invention is to provide an automatic data transmission system in which a central computer accesses the subscriber's data set without disturbing the subscriber in any way.

A still further object of the invention is to prevent persons calling the subscriber from being charged for the call when the telephone is not answered by the subscriber.

A yet further object of the present invention is to provide a data transmission system which automatically transfers calls from human callers to the telephone instrument, allowing the telephone to ring, and which prevents calls from a computer from ringing the telephone.

These and other objects of the present invention are achieved by an apparatus coupling a telephone data set and a telephone instrument to a telephone transmission line so as to enable the communication of data between the data set and a remote location without interfering with normal use of the telephone instrument, comprising first means, coupled to the telephone transmission line, the telephone instrument and the data set and normally connecting the data set to the telephone tanmission line, for disconnecting the data set from the telephone transmission line and connecting the telephone instrument to the telephone transmission line in response to any of selected ones of a plurality of first electrical signals transmitted on the telephone transmission line, the first signals each being indicative of a call from a caller on the telephone transmission line, the first means preventing disconnection of the data set in response to a selected one of the first signals, second means, coupled to the telephone transmission line and the data set, for detecting any of the first electrical signals transmitted on the telephone transmission line without answering the call and for generating a second electrical signal when any of the first electrical signals on the telphone transmission line has terminated, indicating that the caller has hung up, the data set being adapted to communicate data via the first means in response to the generation of the second electrical signal after the selected one of the first electrical signals has terminated.

According to a preferred embodiment of the invention, the apparatus is connected to the telephone line at all times and the subscriber's telephone instrument is always disconnected unless the subscriber regains control of the line by lifting the receiver. When the central computer calls the subscriber's telephone number, the computer allows only one ring before it hangs up. The apparatus, having detected one ring, and waiting a suitable period of time, detects no further rings, causes the data set to dial up the central computer. If, however, a second ring follows the first ring, the apparatus transfers the telephone line to the subscriber's telephone instrument which proceeds to ring and can be used normally. The subscriber can gain direct control of the telephone line at any time by lifing the receiver of his telephone instrument.

Other objects, features, and advantages of the present invention will be apparent from a reading of the detailed description which follows.

BRIEF DESCRIPTION OF THE DRAWINGS

The above objects and other novel features and advantages of the invention will be described in greater detail in the following detailed description with reference to the drawing figures in which:

FIG. 2 illustrates graphically the operation of part of the apparatus of FIG. 1.

DETAILED DESCRIPTION

Figure 1:
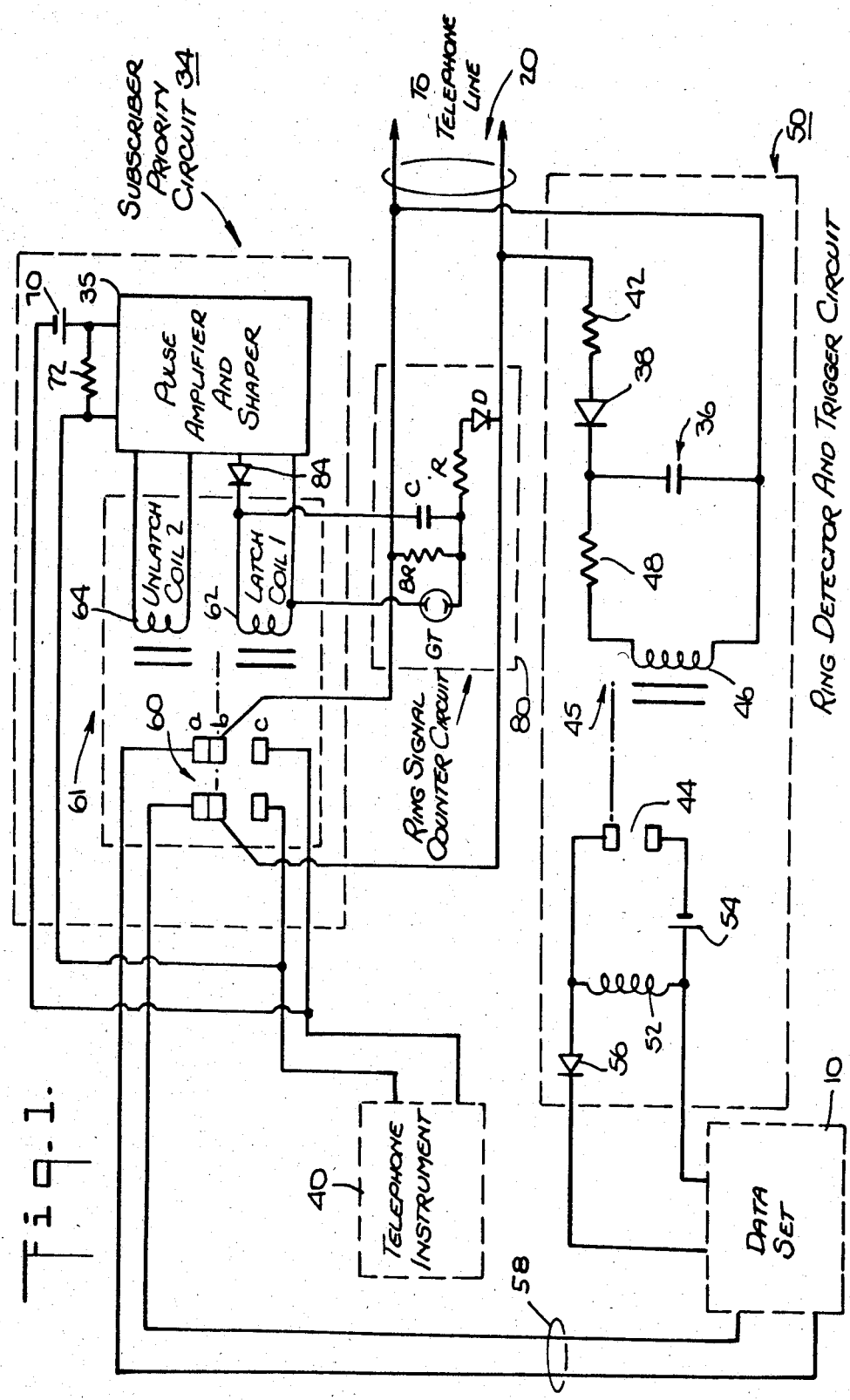
FIG. 1 is a schematic diagram of one embodiment of a time independent data transmission system according to the present invention.

With reference now to the drawings, a time independent data transmission system is shown schematically in FIG. 1. A central computer may access each subscriber's data set 10 at any time through each subscriber's telephone line, indicated by reference numeral 20. The central computer is preferably programmed to provide only one ringing signal or ring burst over the telephone transmission line, although, two or three rings could probably be used, since very few human callers only allow two or three rings before hanging up. In the preferred embodiment, if only one ringing signal is detected, the subscriber's data set will be triggered to dial-up the central computer and communicate with the computer. Two-way communication is contemplated, i.e., the data set may, for example, both receive data from the computer and transmit data to the computer. Additionally, the subscriber may regain use of the telephone instrument during data transmission simply by lifting the telephone receiver.

The apparatus of the present invention may be similar to the apparatus described in the above patent application U.S. Ser. No. 449,756 and filing date 12-14-82. Since operation during a preset time interval is not contemplated, no clock and associated clock-driven switching circuitry is necessary. Instead, data set 10 is normally connected to the telephone line 20 through a first dual set of contacts 60 (a and b) of a relay 61. A ring signal counting circuit 80 is coupled to the telephone line 20 as shown. If counting circuit 80 detects the commencement of a second ring burst, it triggers the latch coil 62 of the relay 61 and thus connects the subscriber's telephone instrument 40 to the telephone line by allowing contacts b and c of contacts 60 to make. The data set is thus disconnected. The subscriber's telephone instrument then proceeds to ring and can be used normally. If a second ring burst does not follow the first ring burst, the data set remains connected to the telephone line and is caused to dial up the central computer, as described in more detail below. Ring signal counter 80 resets itself after each call. After any use of the telephone instrument has been completed the data set is once more connected to the telephone line by the relay 61 which has been unlatched by the operation of the subscriber priority circuit 34, to be described in more detail below. Thus, for selected ones of the ringing signals having more than one ring burst, the data set is disconnected and the telephone instrument connected. For a selected one of the ringing signals, i.e., preferably a ringing signal having only one ring burst, the data set remains connected and the telephone disconnected.

The ring signal counter 80 essentially may be an RC circuit disposed across the telephone lines as shown in FIG. 1 comprising resistor R, capacitor C, diode D, resistor BR and gas discharge tube GT. The time constant is chosen to charge the capacitor C through resistor R and diode rectifier D to approximately one-half of the ring signal voltage on the first ring and to a higher voltage on the second ring as shown in FIG. 2. The higher voltage is sufficient to trigger a gas discharge tube GT in series with the latch coil 62 of relay 61, thus energizing the latch coil and connecting the telephone instrument to the telephone line while disconnecting the data set from the telephone line. A diode 84 is placed between the pulse amplifier and shaper 35, to be described below, and the latch coil 62, to prevent pulses from the circuit 80 from feeding back into circuit 35. A high resistance bleeder resistor BR discharges the capacitor slowly after each single-ring call from the central computer. Other types of counting circuits could obviously be used for this purpose. For example, the gas discharge tube could be replaced by semiconductor devices, e.g., a threshold sensitive zener diode in series with a resistor coupled across the resistor BR, the junction of the zener diode and the resistor being coupled to the base of a switching transistor having its emitter-collector path in series with latch coil 62. Furthermore, other circuits could be used, such as filter circuits and appropriate digital logic counters.

The device shown in FIG. 1 further includes a ring detector and trigger circuit 50, the operation of which will now be explained. When the central computer calls, or if anyone else calls, the ring signal on the telephone line will charge capacitor 36 through rectifying diode 38 and isolating resistor 42. Contacts 44 operated by relay coil 46 of relay 45 will therefore close once relay coil 46 is energized. Resistor 48 and capacitor 36 have a time constant chosen so that capacitor 36 remains sufficiently charged between successive rings of the same call and coil 46 remains energized. When the caller hangs up and the ringing stops, capacitor 36 will slowly discharge through resistor 48 and coil 46 until relay 45 becomes deenergized, opening contacts 44. A voltage source 54 and an inductor 52 in series are disposed across contacts 44. When contacts 44 open, a voltage pulse is induced across inductor 52. This pulse is coupled through diode 56 to the data set 10 to trigger the data set's dial-up function. Diode 56 insures that only pulses of the proper polarity are coupled to the data set. Thus, the opposite pulse induced across inductor 52 when contacts 44 close will not be coupled to the data set. The data set 10 can then dial up the central computer through output lines 58 which are used both for dial-up routines and for data transmission and through dual pairs of contacts a and b of contacts 60 of relay 61 controlled by relay coils 62 and 64. The operation of relay coils 62 and 64 will be described in more detail later with reference to the subscriber priority circuit 34. At the time that the data set 10 initiates the dial-up routine and when the telephone handset is down, the pairs of contacts a and b of contacts 60 will remain made so long as the central computer called (only one ring signal detected by ring signal counter circuit 80), so that the data set output lines are connected to the telephone line 20 and the central computer can be dialed up and communication between data set and computer can occur.

The embodiment of ring detector and trigger circuit 50 shown in FIG. 1 is only one form of the circuit. Relay 45 could be replaced by a switching transistor, for example, and the inductor 52 and related circuitry could be replaced by a single shot or monostable multivibrator triggered to output a pulse when the switching transistor is biased off when the ringing signal terminates.

Should a non-computer call (i.e., more than one ring signal) be received, the data set 10 will attempt to dial-up the computer even though the computer did not call. Because, however, contacts pairs a and b of relay contacts 60 have opened, no such dial up signal will be transmitted to the computer. Should a single ring signal be received which was not generated by the central computer, the central computer can be programmed so that it would ignore the return call because it did not call the data set.

The data set can be any of many commercially available devices. For example, if the system of the invention is used to obtain data regarding the electric power used by a consumer it might comprise a Power Demand Accumulator Model 2000 Series manufactured by Fairchild Space and Electronics Company. The present invention would allow such a device to be coupled to the consumer's normal telephone line and allow power meter readings to be read over the telephone line.

The subscriber priority circuit 34 mentioned earlier is designed to re-connect the telephone instrument 40 to the telephone line 20 when it is normally disconnected if the subscriber lifts the telephone handset to use the phone. Normally, the telephone instrument is disconnected from the telephone line 20 by contacts 60, which also form a part of circuit 34. The telephone, however, is also connected to the pulse amplifier and shaper 35 of subscriber priority circuit 34 via voltage source 70 and resistor 72. The impedance looking into resistor 72 and source 70 is chosen so that it does not interfere with normal telephone use. When the telephone handset is lifted, a voltage pulse of a particular polarity appears across resistor 72. This pulse energizes latch coil 62 of relay 61 through pulse amplifier and shaper 35 and connects the telephone instrument through contacts b and c of contact set 60 of relay 61 to the telephone line 20, while disconnecting the data set from the telephone line by opening normally closed contacts a and b of contact set 60 of relay 61. When the subscriber replaces the telehone handset ("hangs up"), a pulse of opposite polarity to the previous pulse energizes unlatch coil 64 of relay 61 and opens contacts b and c and closes contacts a and b, thus reconnecting the data set to the telephone line and disconnecting the telephone instrument from the telephone line. The pulse amplifier and shaper circuit therefore performs the dual functioin of shaping the pulse at its input and discriminating between positive and negative pulses so as to energize the proper relay coil 62 or 64. Pulse amplifier and shaper 35 may take the form of various circuits known in the art.

Although the invention as shown in the drawing figures indicates discrete components, and schematically indicates some electromechanical relays and switches, it is clear that the system can be constructed utilizing discrete semiconductor devices or embodied in a solid state, integrated circuit produced on a silicon or similar chip. For example, the function of the electromechanical relays which are schematically indicated in the figure could be performed by switching transistors.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An apparatus coupling a telephone data set and a telephone instrument to a telephone transmission line so as to enable the communication of data between the data set and a remote location without interfering with normal use of the telephone instrument, comprising:

first means, coupled to said telephone transmission line, said telephone instrument and said data set and normally connecting said data set to said telephone transmission line, for disconnectingg said data set from said telephone transmission line and connecting said telephone instrument to said telephone transmission line in response to any of selected ones of a plurality of first electrical signals transmitted on said telephone transmission line, said first signals each being indicative of a call from a caller on said telephone transmission line, said first means preventing disconnection of said data set in response to a selected one of said first signals;

second means, coupled to said telephone transmission line and said data set, for detecting any of said first electrical signals transmitted on said telephone transmission line without answering the call and for generating a second electrical signal when any of the first electrical signals on said telephone transmission line has terminated, indicating that the caller has hung up;

said data set being adapted to communicate data via said first means in response to the generation of said second electrical signal after said selected one of said first electrical signals has terminated.

2. The apparatus recited in claim 1, further comprising third menas, coupled to said data set, said telephone instrument and said telephone transmission line, for connecting said telephone instrument to said telephone transmission line and disconnecting said data set from said telephone transmission line in response to a first electrical signal generated by said telephone instrument, and for disconnecting said telephone instrument from said telephone transmission line and reconnecting said data set to said telephone transmission line in response to a second electrical signal generated by said telephone instrument.

3. The apparatus recited in claim 2 wherein said first means comprises first switching means coupled to said telephone instrument, said telephone transmission line and said data set and normally connecting said data set to said telephone transmission line.

4. The apparatus recited in claim 1 wherein each of said plurality of first electrical signals transmitted on said telephone transmission line comprises a ringing signal having a varying number of ring bursts, and wherein said second means generates said second electrical signal when the transmission of said ringing signal on said telephone transmission line terminates.

5. The apparatus recited in claim 4 wherein said selected one of said first electrical signal is a ringing signal having a single ring burst, said first means preventing disconnection of said data set when said ringing signal having a single ring burst is detected.

6. The apparatus recited in claim 4 wherein said second means comprises:

induction means coupled to said data set;
a source of voltage coupled to said induction means; and second switching means coupled to said telephone transmission line and said source of voltage, and responsive to said ringing signal, for connecting said source of voltage to said induction means when said ringing signal is present on said telephone transmission line and for disconnecting said source of voltage from said induction means when said ringing signal terminates, said induction means generating said second electrical signal when said source of voltage is disconnected.

7. The apparatus recited in claim 3 wherein said first electrical signals each comprise ringing signals having a varying number of ring bursts and said first means further comprises counting means for sensing the number of ring bursts in said first electrical signals and for preventing disconnection of said data set from said telephone transmission line if the number of ring burst is one and for disconnecting said data set from the telephone transmission line if the number of ring bursts is greater than one.

8. The apparatus recited in claim 7 wherein said counting means comprises resistor-capacitor circuit means for charging to a first voltage if only one ring burst occurs and for charging to a second higher voltage if more than one ring burst occurs, and threshold sensitive means responsive to a voltage at least as high as said second voltage, said threshold sensitive means being coupled to said first means and causing said first means to disconnect said data set from the telephone transmission line when said resistor capacitor circuit means charges to at least said second voltage.

9. The apparatus recited in claim 3 wherein said third means includes said first switching means normally connecting said telephone transmission line to said data set, and circuit means, coupled to said first switching means and said telephone instrument, for generating first and second electrical signals and being responsive to said first and second signals generated by said telephone instrument, said first switching means being responsive to said first and second signals generated by said circuit means and disconnecting said data set from said telephone transmission line and connecting said telephone instrument to said telephone transmission line in response to said first signal generated by said circuit means and connecting said data set to said telephone transmission line and disconnecting said telephone instrument from said telephone transmission line in response to said second signal generated by said circuit means.

10. The apparatus recited in claim 9 wherein said first signal generated by said telephone instrument is generated when the telephone receiver is lifted, and said second signal generated by said telephone instrument is generated when the telephone receiver is replaced.

11. The apparatus recited in claim 10 wherein said first and second signals generated by said telephone instrument comprise pulse signals of opposite polarity and said circuit means includes pulse discrimination means for discriminating between said pulse signals generated by said telephone instrument.

* * * * *

UNITED STATES PATENT AND TRADEMARK OFFICE
CERTIFICATE OF CORRECTION

PATENT NO. : 4,578,534

DATED : March 25, 1986

INVENTOR(S) : Edwin F. Shelley

It is certified that error appears in the above-identified patent and that said Letters Patent is hereby corrected as shown below:

Col. 1, line 9, before "Synchronized" insert --Time--.

Col. 2, line 31, delete "telehone" and insert --telephone--.

Col. 3, lines 22, 23, delete "tanmission" and insert --transmission--.

Col. 3, line 37, delete "telphone" and insert --telephone--.

Col. 6, line 36, delete "telehone" and insert --telephone--.

Col. 6, line 42, delete "functioin" and insert --function--.

Col. 7, line 6, delete "disconnectingg" and insert --disconnecting--.

Col. 7, line 29, delete "menas" and insert --means--.

Col. 7, line 53, change "signal" (second occurrence) to -- signals --.

Signed and Sealed this

Fifth Day of August 1986

[SEAL]

Attest:

DONALD J. QUIGG

Attesting Officer

Commissioner of Patents and Trademarks